3,541,055
CROSSLINKABLE LACQUER RESINS
Georg Malamet and Bernd Peltzer, Krefeld, Hermann Schnell, Krefeld-Urdingen, and Clemens Niehaus, Krefeld, Germany, assignors to Farbenfabriken Bayer Aktiengesellschaft, Leverkusen, Germany, a corporation of Germany
No Drawing. Filed July 24, 1968, Ser. No. 747,088
Claims priority, application Germany, Aug. 22, 1967, F 53,303
Int. Cl. C08f 15/40, 27/12
U.S. Cl. 260—78.4                             6 Claims

ABSTRACT OF THE DISCLOSURE

A lacquer resin which is the semiester of an $\alpha$-hydroxycarboxylic acid ester and a cyclic dicarboxylic acid anhydride, said $\alpha$-hydroxycarboxylic acid ester being an ester of (A) a copolymer of at least one vinyl monomer and a polymerizable monomer having both a single epoxide group and a polymerizable double bond and (B) a hydroxycarboxylic acid.

---

The invention relates to vinyl lacquer resins with good technical lacquering properties and to a process for the production thereof.

It is known to produce copolymers from monomers which contain one epoxide group and one copolymerisable double bond, such as, for example, glycidylacrylate, and at least one additional vinyl monomer, and to react the copolymers thus obtained with drying fatty acids (see British patent specification No. 793,776) or with saturated fatty acids, aromatic acids or cycloaliphatic carboxylic acids and to use them as lacquer resins (see Japanese patent application 29,194/64; abridgement in Derwent Japanese Patents Report, vol. 3, No. 50, page 4, right-hand column (1965)).

One disadvantage of the aforesaid copolymers modified with carboxylic acids lies in the insufficient compatibility with aminoplasts, such as melamineformaldehyde, urea-formaldehyde or benzoguanamine-formaldehyde resins. This insufficient compatibility leads to lacquer films without a very high gloss, unsatisfactory mechanical properties and also too low a resistance to weather influences and agents such as, for example, organic solvents.

Furthermore, it is known that copolymers of relatively non-polar monomers such as styrene, methacrylates and ethacrylates and/or hydroxyalkyl methacrylates or acrylates as more strongly polar monomers likewise show an insufficient compatibility with aminoplasts.

As will be seen from comparison experiment 2 in this application, this insufficient compatibility with aminoplasts cannot be improved by reaction of a part of the hydroxyl groups with dicarboxylic acid anhydrides with the formation of semiesters.

It is now the object of the invention to modify copolymers from monomers with one epoxide group and one copolymerisable double bond and at least one additional vinyl monomer, such as styrenes and methacrylates or acrylates and/or hydroxyalkyl methacrylates or acrylates in such a way that lacquer resins which are compatible with aminoplasts are obtained.

This object is achieved by firstly reacting the copolymers from the monomers referred to above with an aliphatic hydroxycarboxylic acid. In this case, essentially the carboxyl group of the hydroxycarboxylic acid reacts with the epoxide groups contained in the copolymer, with the formation of $\alpha$-hydroxycarboxylic acid esters. Thereafter, the reaction products thus obtained and containing hydroxyl groups—as well as the hydroxyl groups introduced or formed by the addition of the hydroxycarboxyl acid to the epoxide group (2 hydroxyl groups per mol of epoxide group and per mol of hydroxycarboxyl acid), however, other hydroxyl groups can be contained in the reaction products, caused by the possible copolymerisation of hydroxyalkyl methacrylates or acrylates—are reacted with cyclic dicarboxylic acid anhydrides, with the formation of semiesters.

It must be considered as surprising, by comparison with the prior art, that an excellent compatibility of the copolymers with aminoplasts is obtained by the measures according to the invention.

The subject of the invention is thus a process for the production of lacquer resins from copolymers of monomers with an epoxide group and a copolymerisable double bond and at least one additional vinyl monomer, by reaction with carboxylic acids and anhydrides, and is characterised by the copolymer being first heated with a hydroxycarboxylic acid and thereafter with a cyclic dicarboxylic acid anhydride.

As monomer within the terms of the invention, the following can be contained in the copolymers in copolymerised form: styrene, styrenes substituted on the nucleus by alkyl groups, such as methyl groups, and halogens, such as chlorine; $\alpha$-methylstyrene, esters of acrylic and methacrylic acids, more especially those with saturated monohydric aliphatic alcohols with 1–20 carbon atoms or cycloaliphatic alcohols with 5–10 carbon atoms, and hydroxylalkyl methacrylates or acrylates, such as 2-hydroxypropyl and 2-hydroxyethyl methacrylates or acrylates.

Furthermore, the following may for example have been copolymerised as comonomers containing epoxide groups: butadiene monoxide, allyl glycidyl ether, p-isopropenyl-phenyl glycidyl ether, advantageously glycidyl acrylate and methacrylate.

For the reaction with the copolymers containing epoxide groups, the following are to be considered as examples: aliphatic hydroxycarboxylic acids with 3–25 carbon atoms, advantageously with 8–18 carbon atoms: The following are to be particularly mentioned: 1-hydroxypropionic acid, 2-hydroxypropionic acid, 1-hydroxybutyric acid, 5-hydroxycaproic acid, 7-hydroxyenanthic acid, 1-hydroxycaprinic acid, 1-hydroxymyristic acid, 14-hydroxymyristic acid, 14-hydroxybehenic acid, advantageously 9-hydroxystearic acid, 12-hydroxystearic acid, 18-hydroxystearic acid, 9-hydroxypelargonic acid, 9,10-dihydroxystearic acid, 12-hydroxyoleic acid.

The following are to be mentioned as examples of cyclic dicarboxylic acid anhydrides which can be reacted with the hydroxyl group-containing reaction products of the copolymer hydroxycarboxylic acid: the anhydrides of succinic acid, diglycolic acid, maleic acid, itaconic acid, hexahydrophthalic acid, methylhexahydrophthalic acid, endomethylene-tetrahydrophthalic acid, phthalic acid, tetrahydrophthalic acid, tetrachlorophthalic acid, tetrabromophthalic acid, 1,4,5,6,7,7-hexachlorobicyclo(2,2,1) hept-5-ene-2,3-dicarboxylic acid, advantageously phthalic acid, tetrahydrophthalic acid, tetrachlorophthalic acid, maleic acid.

The copolymers serving as starting materials which may present 20 to 94.5% by weight of the solid end product can be obtained by known processes, for example, under the conditions disclosed in British patent specification No. 793,776. However, it is also possible first of all to add the hydroxycarboxylic acid to the comonomer containing epoxide groups and then to copolymerise the addition product with other suitable vinyl monomers.

The reaction of the hydroxycarboxylic acids with the previously described copolymers containing epoxide groups is preferably carried out in inert solvents at temperatures from 80 to 200° C., advantageously from 120 to 180° C.

Aromatic hydrocarbons such as benzene, toluene, xylene or mixtures of aromatic compounds, aliphatic or cycloaliphatic hydrocarbons such as cyclohexane, cyclooctane, esters or ketones, such as ethyl acetal, butyl acetate, hexyl acetate, ethylglycol acetate, methylethyl ketone, cyclohexanone, halogenated hydrocarbons, such as ethylene chloride, trichlorethylene, chlorobenzene, dichlorobenzenes, alcohols such as butanol are suitable as solvents for example.

The hydroxycarboxylic acids can be introduced in quantities of 5–60% by weight, advantageously 10–50% by weight, calculated on the solid end product.

The quantity of the comonomer containing epoxide groups is determined by the quantity of hydroxycarboxylic acid required in the end product. An equivalent ratio between carboxyl groups of the hydroxycarboxylic acid and the epoxide content of the copolymer is preferably chosen but it is also possible to use an excess of one or the other component.

The reaction of the copolymer containing hydroxycarboxylic acid with the dicarboxylic acid anhydrides preferably takes place in one of the aforementioned solvents at temperatures between 50 and 200° C., advantageously between 80 and 150° C.

The dicarboxylic acid anhydride is used in quantities from 0.5–20% by weight, and advantageously 1–5% by weight, calculated on the solid end product.

The lacquer resin obtained according to the invention are characterised by an excellent compatibility with aminoplasts, such as urea-formaldehyde, benzoguanamine-formaldehyde and melamine-formaldehyde resins. The aminoplasts may be generally used in amounts of 25 to 50% by weight, based on the solid end product, i.e. copolymer+hydroxycarboxylic acid+cyclic dicarboxylic acid anhydride. Highly concentrated lacquer resin solutions with relatively low viscosity and good pigment wetting can be produced.

The lacquer resin solutions, more especially combined with aminoplasts, can be applied to suitable supports, consisting for example of wood, glass, paper, metal, stone, ceramics and concrete, and can be stoved at temperatures from about 80–250° C., advantageously from 80°–150° C., cross-linking taking place.

The stoved films have a high degree of hardness, an outstanding gloss, a high elongation and a good resistance to solvents.

EXAMPLE 1

A mixture of 210 g. of styrene, 140 g. of ethylacrylate and 49.4 g. of glycidyl methacrylate is dissolved in 500 g. of a mixture of aromatic hydrocarbons with a boiling range from 160–175° C. and, after adding 4 g. of azodiisobutyronitrile and 0.6 g. of dodecyl mercaptan, polymerisation takes place for 21½ hours under nitrogen at 80° C. After polymerisation, the conversion is 100% and a colourless solution of 44.5% by weight solids content and with an acid number of 0.4 is obtained.

95 g. of 12-hydroxystearic acid are added to this solution of the copolymer containing epoxide groups, and the mixture is stirred for 7½ hours at 160° C. Thereafter the acid number is about 1 and the reaction is thus almost complete. Subsequently, after adding 10 g. of phthalic acid anhydride, the mixture is stirred for 1¼ hours at 130° C., semiesters being formed with the hydroxyl groups present in the copolymer. A clear, light yellow solution with a solids content of 50% by weight is obtained, this solution showing a discharge viscosity in a 4 mm. DIN beaker of 161 seconds (at 20° C.), an acid number of 5 and an OH-number of 34–35.

EXAMPLE 2

A mixture of 165 g. of styrene, 111 g. of ethyl acrylate and 74 g. glycidyl methacrylate is dissolved in 500 g. of a mixture of aromatic hydrocarbons with a boiling range of 160–175° C. and, after adding 5 g. of azodiisobutyronitrile and 0.75 g. of dodecyl mercaptan, polymerisation takes place under the conditions indicated in Example 1 to give a colourless solution of 41% by weight solids content and with an acid number of 0.7. After adding 142 g. or 12-hydroxystearic acid, stirring takes place for 7½ hours at 160° C.

A yellow solution with an acid number of 1 is obtained, and this solution is reacted in a manner analogous to Example 1 with 10 g. of phthalic acid anhydride.

The solution thus obtained, with a 50% by weight solids content, shows a discharge viscosity in a 4 mm. DIN beaker of 173 seconds (24° C.); the acid number is 5.5 and the OH-number 52–53.

EXAMPLE 3

A mixture of 120 g. of styrene, 81.3 g. of ethyl acrylate and 98.7 g. of glycidyl methacrylate is dissolved in 500 g. of a mixture of aromatic hydrocarbons with a boiling range from 160–175° C. and, after the addition of 3 g. of azodiisobutyronitrile and 0.5 g. of dodecyl mercaptan, polymerisation takes place for 18½ hours at 80° C. under nitrogen. A colourless solution with a 37.5% by weight solids content and an acid number of 0.5 is obtained.

This solution is reacted for 7½ hours at 160° C. with 190 g. of 12-hydroxystearic acid and then for 1¼ hours at 140° C. with 10 g. of phthalic acid anhydride, a yellow solution is formed with a solids content of 50% by weight and shows a discharge viscosity of 272 seconds (at 22° C. in the DIN beaker 4), an acid number of 4 and an OH-number of 62–63.

EXAMPLE 4

A mixture of 165 g. of styrene, 111 g. of methylmethacrylate and 67 g. of glycidyl acrylate is dissolved in 500 g. of a mixture of aromatic hydrocarbons with a boiling range from 160–175° C. and after the addition of 3.5 g. of azodiisobutyronitrile and 0.5 g. of dodecyl mercaptan, polymerisation takes place for 18½ hours at 80° C. The solution obtained, with a solids content of 41% by weight, has an acid number of 0.6.

After reaction with 142 g. of 12-hydroxystearic acid and 10 g. of phthalic acid anhydride, as described in Example 3, a light yellow solution is obtained which has a solids content of 50% by weight and shows a discharge viscosity of 615 seconds (DIN beaker 4, 25° C.), an acid number of 5 and an OH-number of 53.

Similar results are obtained if the phthalic acid anhydride is replaced by the anhydrides of tetrahydrophthalic acid, maleic acid or tetrabromophthalic acid.

EXAMPLE 5

A copolymer prepared in a manner analogous to Example 2, after being reacted with 12-hydroxystearic acid, is reacted with 10.4 g. of tetrahydrophthalic acid anhydride instead of phthalic acid anhydride. The solution which is formed has a discharge viscosity of 131 seconds (DIN beaker 4, 24° C.), an acid number of 4.5 and an OH-number of 47–51.

EXAMPLE 6

The tetrahydrophthalic acid anhydride in Example 5 is replaced by 6.7 g. of maleic acid anhydride and the reaction takes place at 125° C. The solution has a discharge viscosity of 164 seconds (DIN beaker 4, 24° C.), an acid number of 4 and an OH-number of 43.

EXAMPLE 7

The tetrahydrophthalic acid anhydride in Example 5 is replaced by 31.3 g. of tetrabromophthalic acid anhydride and the reaction takes place at 120° C. The solution has a discharge viscosity of 325 seconds (DIN beaker 4, 24° C.), an acid number of 4 and an OH–number of 44–45.

Corresponding results are produced by using the anhydrides of succinic or tetrachlorophthalic acid instead of that of phthalic acid.

EXAMPLE 8

A copolymer prepared in a manner analogous to Example 2 is reacted with 142 g. of 12-hydroxyoleic acid instead of the 12 hydroxystearic acid, and for 7½ hours at 160° C. A light yellow solution is obtained which has an acid number of 0.9, and this solution is reacted in a manner similar to Example 1 with 10 g. of phthalic acid anhydride.

The solution thus obtained, with a solids content of 50% by weight, shows a discharge viscosity in a 4 mm. DIN beaker of 212 seconds (24° C.), while the acid number is 6.0 and the OH-number is 50–51.

Comparison test 1

For comparison purposes, a copolymer prepared according to Example 2 is reacted with 140 g. of ricinenic acid instead of the 12-hydroxystearic acid. After subsequent reaction with 10 g. of phthalic acid anhydride (1¼ hours at 140° C.) a yellow solution is obtained which has a solids content of 50% by weight and an acid number of 7.3. Discharge viscosity: 210 seconds (DIN beaker 4, 24° C.).

Comparison test 2

For comparison purposes, a mixture of 165 g. of styrene, 195 g. of ethyl acrylate and 140 g. of 2-hydroxypropyl methacrylate is dissolved in 500 g. of xylene-ethylglycol acetate (ratio by weight 9:1) and, after adding 5 g. of azodiisobutyronitrile and 0.9 g. of dodecyl mercaptan, polymerisation takes place for 14½ hours under nitrogen at 80° C.

A colourless solution is obtained which has a discharge viscosity of 141 seconds (DIN beaker 4, 25° C.), an acid number of 3 and an OH-number of 58.

After adding 10 g. of phthalic acid anhydride, this solution is stirred for 1¼ hours at 140° C. and then shows a discharge viscosity of 157 seconds (DIN beaker 4, 25° C.), an acid number of 6 and an OH-number of 54.

The compatibility of the examples given above with some aminoplasts which are suitable for the crosslinking is shown by the following table.

| Example No.: | Urea-formaldehyde resins | Benzoguanamine formaldehyde resins | Melamine-formaldehyde resins |
|---|---|---|---|
| 1 | Good | Very good | Good. |
| 2 | Very good | do | Very good. |
| 3 | do | do | Do. |
| 4 | do | do | Do. |
| 5 | do | do | Do. |
| 6 | do | do | Do. |
| 7 | do | do | Do. |
| 8 | do | do | Do. |
| 1¹ | Poor | Poor | Bad. |
| 2¹ | Bad | Good | Bad. |

¹ Comparison tests.

The judging of the stages: very good, good, poor and bad is made from the following viewpoints:

very good: the stoved clear lacquer films do not show any clouding good: some of the stoved clear lacquer films show a slight clouding poor: the stoved clear lacquer films are only without any clouding in combination with a few resins bad: all the stoved clear lacquer films show a clouding.

In order to demonstrate the technical lacquering properties of lacquers which are based on the binders according to the invention, white lacquers are employed which use the resins according to Examples 2 and 7.

To 200 g. of the respective polymer solution with approximately 50% by weight solid content, there are added 200 g. of titanium dioxide pigment (rutile) and 1 g. of calcium naphthenate solution (solvent xylene, metal content 4%). This mixture is ground twice on a three-roll stand.

The paste thus obtained is formed into a lacquer with another 186 g. of the polymer solution and 104 g. of a melamine formaldehyde solution (55% by weight in butanol), and, after adding 2.5 g. of silicone oil (1% in xylene), 10 g. of butanol and 15 g. of butyl glycolate, is adjusted with xylene/butanol (ratio by weight 3:1) to a discharge viscosity of 20 seconds in the DIN beaker 4.

For the technical lacquering test, the lacquer is sprayed onto glass sheets and also onto steel sheets with a thickness of 0.1 and 0.5 mm. After an evaporation time of about 10 minutes, stoving is carried out for 30 minutes at 110° or 130° C.

| Copolymer used | Stoving conditions | Pendulum hardness according to König | Penetration depth according to Philips, μ | Erichsen indentation, mm. | Gloss according to Gardener 20° angle |
|---|---|---|---|---|---|
| Lacquer resin of Example 2 | 30′/130° C. | 160″ | 4.8 | 7.0 | 80 |
| Lacquer resin of Example 7 | 30′/110° C. | 165″ | 4.7 | 6.4 | 77 |
| Lacquer resin of comparison test 1 | 30′/130° C. | 141″ | 5.2 | 6.0 | 31 |
| Lacquer resin of comparison test 2 | 30′/130° C. | 152″ | 4.5 | 1.1 | 23 |

It is to be seen from the foregoing table that the stoved, crosslinked films based on the lacquer resins according to the invention have a high gloss and an excellent hardness factor and a high elasticity.

What we claim is:

1. A lacquer resin comprising a semiester of an α-hydroxycarboxylic acid ester, said α-hydroxycarboxylic acid ester being an ester of
   (A) a copolymer of (1) a polymerizable monomer having both a single epoxide group and a polymerizable double bond and (2) at least one vinyl monomer selected from the group consisting of styrene, styrene having an alkyl or halogen nuclear substituent, acrylic and methacrylic acid esters with saturated monohydric alcohols containing 1–20 carbon atoms or with cycloaliphatic alcohols containing 5–10 carbon atoms and hydroxyalkyl methacrylates and acrylates and
   (B) an aliphatic hydroxycarboxylic acid having from 3 to 25 carbon atoms;
said semiester being the esterification product of said ester of (A) and (B) and
   (C) a cyclic dicarboxylic acid anhydride;
there being, based on the weight of said lacquer resin, from about 94.5–20% by weight of (A), 5–60% by weight of (B) and 0.5–20% by weight of (C) in said lacquer resin.

2. The lacquer resin of claim 1 wherein said cyclic dicarboxylic acid anhydride is selected from the group consisting of the anhydrides of phthalic acid, tetrahydrophthalic acid, tetrachlorophthalic acid and maleic acid.

3. The lacquer resin of claim 1 wherein said polymerizable monomer having both a single epoxide group and a polymerizable double bond is selected from the group consisting of butadiene monoxide, allyl glycidyl ether, p-isopropenylphenyl glycidyl ether, glycidyl acrylate and glycidyl methacrylate.

4. The lacquer resin of claim 1 wherein said aliphatic hydroxycarboxylic acid is selected from the group consisting of 1-hydroxypropionic acid, 2-hydroxypropionic acid, 1-hydroxybutyric acid, 5-hydroxycaproic acid, 7-hydroxyenanthic acid, 1-hydroxycaprinic acid, 1-hydroxymyristic acid, 14 - hydroxymyristic acid, 14-hydroxybehenic acid, 9-hydroxystearic acid, 12-hydroxystearic acid, 18 - hydroxystearic acid, 9 - hydroxypelargonic acid, 9,10-hydroxystearic acid and 12-hydroxyoleic acid.

5. The lacquer resin of claim 1 containing from about 10 to 50% by weight of (B).

6. The lacquer resin of claim 1 containing from 1 to 5% by weight of (C).

References Cited

UNITED STATES PATENTS

| 2,787,561 | 4/1957 | Sanders | 117—232 |
| 3,297,621 | 1/1967 | Taft | 260—29.6 |

FOREIGN PATENTS

| 1,053,227 | 12/1966 | Great Britain. |

JOSEPH L. SCHOFER, Primary Examiner

J. KIGHT, Assistant Examiner

U.S. Cl. X.R.

260—2, 18, 19, 23, 45.2, 67.5, 67.6, 71, 80.8, 80.81, 851